No. 621,074. Patented Mar. 14, 1899.
P. H. GRIMM.
ROTARY STEAM DRIER.
(Application filed Feb. 25, 1898.)
(No Model.) 2 Sheets—Sheet 1.
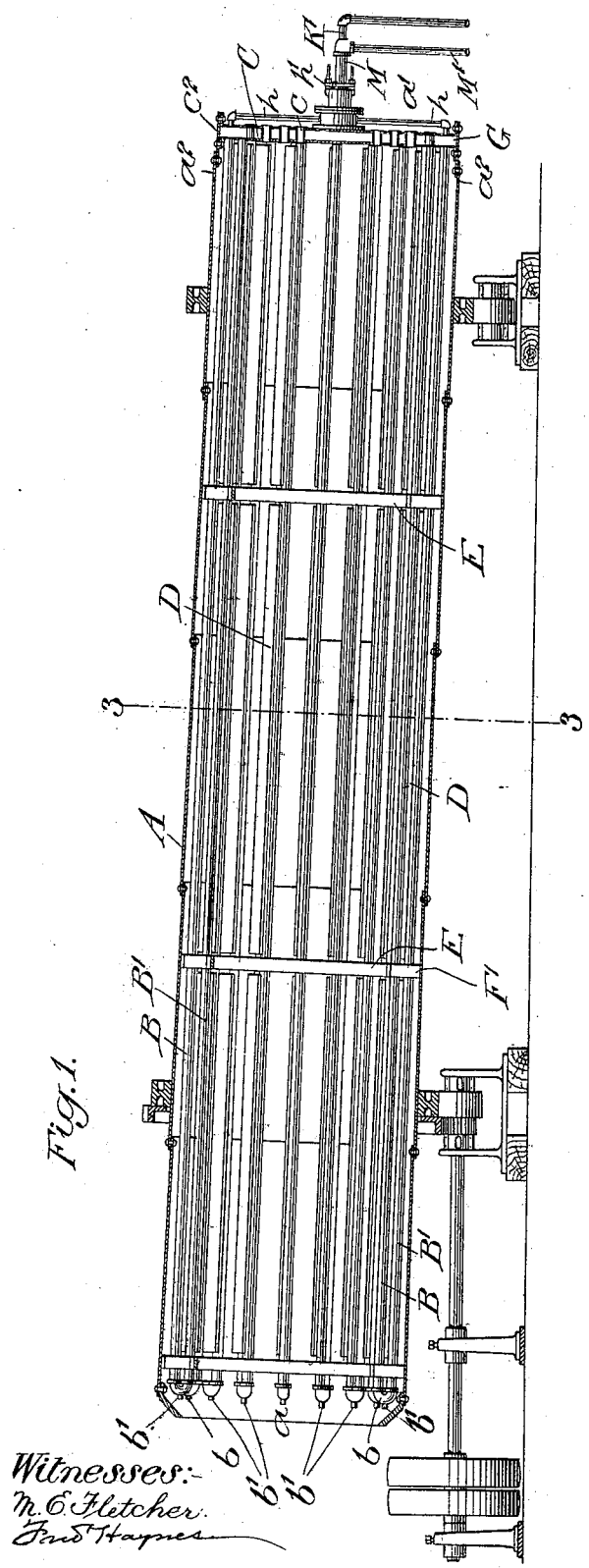
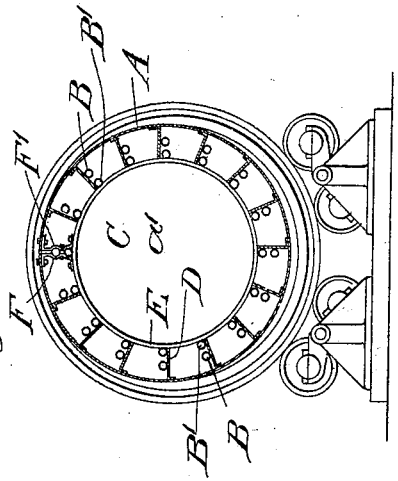
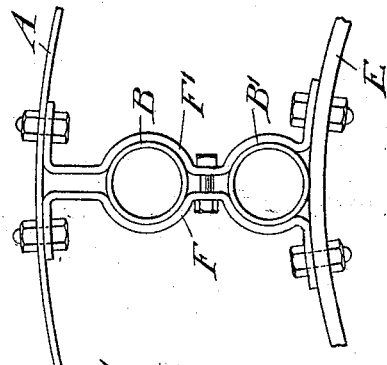
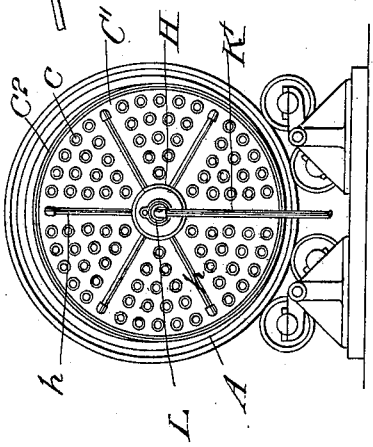
Witnesses:
N. E. Fletcher
Fred Haynes
Inventor:
Paul H. Grimm
by attorneys No. 621,074. Patented Mar. 14, 1899.
P. H. GRIMM.
ROTARY STEAM DRIER.
(Application filed Feb. 25, 1898.)
(No Model.) 2 Sheets—Sheet 2.
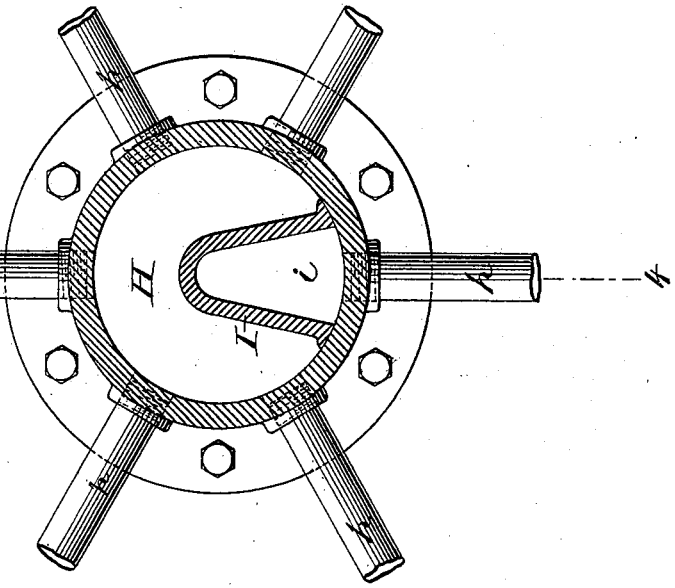
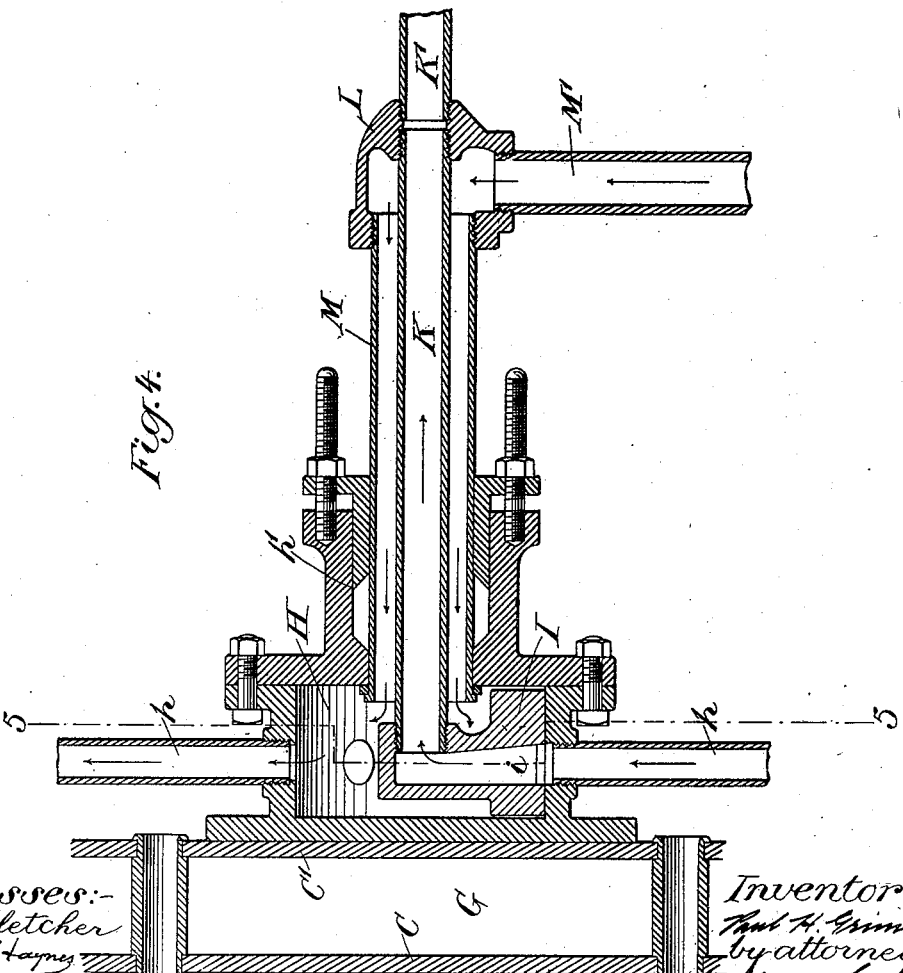
Witnesses:— Inventor:—

UNITED STATES PATENT OFFICE.

PAUL H. GRIMM, OF GLENCOVE, NEW YORK.

ROTARY STEAM-DRIER.

SPECIFICATION forming part of Letters Patent No. 621,074, dated March 14, 1899.

Application filed February 25, 1898. Serial No. 671,675. (No model.)

*To all whom it may concern:*

Be it known that I, PAUL H. GRIMM, a citizen of the United States, and a resident of Glencove, in the county of Queens and State of New York, have invented a new and useful Improvement in Rotary Steam-Driers, of which the following is a specification.

My invention relates to an improvement in rotary steam-driers, with the object in view of simplifying their structure and adding to their efficiency.

A practical embodiment of my invention is represented in the accompanying drawings, in which—

Figure 1 is a view of the drier in longitudinal vertical section as it appears in use. Fig. 2 is an end view. Fig. 3 is a section on the line 3 3 of Fig. 1. Fig. 4 is an enlarged partial longitudinal section through the steam-chambers at the end of the drier. Fig. 5 is a transverse section on the line 5 5 of Fig. 4; and Fig. 6 is an enlarged view in detail of a pair of brackets for holding one of the steam-pipe sections in position, showing the same in their assembled adjustment with respect to the steam-pipes and the shell interior and interior ring of the drier.

The casing of the drier is denoted by A. It is preferably made in the form of an elongated cylinder and is mounted in any well-known or approved manner so as to be rotated at such a speed as may be desired. Its end, into which the material to be dried is fed, is denoted by $a$ and is somewhat higher than the discharge end $a'$, so that the material will gradually travel under the influence of gravity from its point of entrance to its point of discharge.

Within the casing A and located in proximity to its shell numerous steam-pipe sections are secured, each section consisting of a pair of parallel branches B B', connected at the receiving end of the casing by a coupling $b$, provided with an automatic air-escape valve $b'$ of well-known form and having the opposite ends of the branches left open and screwed into a head-plate C at the discharge end of the drier. The branches of each pipe-section are arranged in a radial plane and are separated from the branches of a neighboring pipe-section by shelves or screens D, which are arranged in radial planes extending from the interior of the shell or casing A inwardly toward the axis of the casing a distance corresponding to the distance which the pipe-sections extend.

The shelves and pipe-sections are held in position, the former by engaging them by suitable fastenings with the wall of the casing A and with rings E, located at intervals along the length of the interior of the casing and of a diameter sufficiently less than the diameter of the casing to permit the pipe-sections and shelves to occupy the space between their exteriors and the interior of the casing A. The pipe-sections are held in position by brackets F F', arranged in couplets, as clearly shown in Fig. 6, the said brackets being fitted to embrace the branches of the pipe-section and provided with flanges for fastening them to the wall of the casing and the rings E.

As the casing is rotated the material fed in at the receiving end is held by the shelves D, during a considerable portion of the revolution of the casing, in intimate contact with the steam-pipe sections, and finally when the shelf, during the rotary movement of the casing, reaches a position sufficiently steep to permit the material to drop off the latter is received by one or more shelves at the opposite side of the casing and again held in contact with the heating-surfaces, and so on until it is finally discharged in a dry condition through openings $a^2$ at the end $a'$ of the casing.

The steam for supplying the several pipe-sections to keep them hot is first admitted into a steam-chamber G at the end $a'$ of the casing, and from this chamber, which is open to the branches of the several pipe-sections, the steam circulates through the pipe-sections and the water of condensation is returned along the lower sides of the said pipe-sections, because of the inclination of the casing, into the chamber G and from there is removed by the pressure of the steam in the chamber, as follows: Exterior to the wall C' of the chamber G, which wall may be in general structure a duplicate of the head-plate C and may be spaced therefrom by an annular ring $C^2$ to form the chamber G, there is attached a steam-chest H, having its interior of cylindrical form and connected by pipes $h$, radiating therefrom, with the steam-chamber G through suitable openings in the wall C'.

Within the cylindrical interior of the steam-chest H there is located a valve I, having a port $i$ in its face, which corresponds to the ports in the chest opening into the pipes $h$. The valve I is held in a fixed position by means of a pipe K, which at one end is engaged with the valve within the steam-chest and at its opposite end is engaged with a fixed support L. The pipe K has open communication with the port $i$ in the valve and extends from the steam-chest H within a larger pipe M, which has a steam-pipe connection with the wall of the valve-chest by means of a suitable stuffing-box $h'$ and the interior of which is open to the interior of the valve-chest. The pipe M is also held in fixed position by the support L, and the valve-chest H, together with its branches $h$, rotate on the pipe M as the casing A rotates, thereby bringing the pipes $h$ successively in position to register with the port $i$ in the valve I.

In connection with the pipe K there is a pipe K′, fixed to the support L and leading to a point where it is desired to discharge the water of condensation. The interior of the pipe M is in communication by means of a pipe M′ with a steam-supply. (Not shown.)

It will be observed that the pipes $h$ (see Fig. 2) lead to points in the wall C′ of the chamber G near its outer margin, so that as the casing A rotates they will be brought successively into position to connect with the interior of the chamber G at its bottom, where the water of condensation accumulates.

At the same time that any pipe $h$ communicates with the bottom of the chamber G its opposite end will register with the port $i$ in the valve I, so that the pressure of the steam within the chamber G will force the water of condensation through that particular branch pipe $h$ which for the time being communicates with the bottom of the chamber G out through the valve I and pipes K K′ to the point where it is desired to discharge it. At the same time the steam will flow through the pipes M M′ into the chest H and from it will be distributed through all those pipes $h$ into the chamber G excepting that pipe $h$ which for the time being is covered by the valve I.

In order to supply a current of hot air to the interior of the drier and at the same time to stay the opposite walls C C′ of the steam-chamber, I connect said walls by means of hollow stay-bolts $c$, which may be conveniently expanded into the walls of the chamber and which form a free circulation of air through from the outside into the interior of the casing A, and because of their passage through the chamber G they will perform the additional function of supplying hot air to the interior of the casing. The passage of hot air into the lower end of the cylinder and its exit from the upper end of the cylinder will tend to carry off moisture which arises from the drying process going on within the cylinder, and thereby materially aid the process of drying.

I find the above-described machine very effective in drying the germs of grain which have been removed from the kernels in the process of starch-making; but I do not wish to restrict its use to this particular art, as it is obvious that its use is much more general than this.

What I claim is—

1. A drier comprising a casing for the reception and discharge of the material to be dried, the said casing being mounted to rotate, a steam-chamber at one end of the casing, steam-pipes extending along within the casing and opening into said steam-chamber, pipes leading to said steam-chamber at intervals, a steam-inlet pipe, a separate discharge-pipe, and means for successively connecting the pipes leading to the steam-chamber with the discharge-pipe for discharging the water of condensation, substantially as set forth.

2. A drier comprising a casing for the reception and discharge of the material to be dried, the said casing being mounted to rotate, a steam-chamber at one end of the casing, steam-pipes extending along within the casing and opening into the said steam-chamber, a steam-chest, a steam-inlet pipe and a discharge-pipe connected with said chest, pipes leading from the steam-chest to the steam-chamber at intervals, and means for successively connecting the last-named pipes with the discharge-pipe for discharging the water of condensation, substantially as set forth.

3. A drier comprising a casing mounted to rotate and provided with inlet and discharge openings, a steam-chamber at one end of the casing, pipes extending along within the casing and opening within said steam-chamber, a steam-chest fixed to rotate together with the casing and steam-chamber, branch pipes connecting the steam-chest with the steam-chamber at intervals, a fixed pipe for admitting steam to the steam-chest, a discharge-pipe extending along within the said steam-pipe and a valve for separating the interior of the steam-chest from the discharge-pipe and successively connecting the branch pipes with the discharge-pipe, substantially as set forth.

4. A drier comprising a casing mounted to rotate and provided with inlet and discharge openings, a steam-chamber at one end of the casing, hollow stay-bolts connecting the opposite walls of the chamber for admitting air from the outside from the chamber through the interior of the casing and means for admitting steam into the chamber and discharging the water of condensation from the chamber, substantially as set forth.

In testimony that I claim the foregoing as my invention I have signed my name, in presence of two witnesses, this 9th day of February, 1898.

PAUL H. GRIMM.

Witnesses:
FREDK. HAYNES,
EDWARD VIESER.